US012239133B2

(12) United States Patent
Suganuma et al.

(10) Patent No.: US 12,239,133 B2
(45) Date of Patent: Mar. 4, 2025

(54) HERBICIDAL COMPOSITION

(71) Applicant: ISHIHARA SANGYO KAISHA, LTD., Osaka (JP)

(72) Inventors: Taketo Suganuma, Osaka (JP); Shota Fukuda, Osaka (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 627 days.

(21) Appl. No.: 17/610,263

(22) PCT Filed: May 18, 2020

(86) PCT No.: PCT/JP2020/019678
§ 371 (c)(1),
(2) Date: Nov. 10, 2021

(87) PCT Pub. No.: WO2020/241361
PCT Pub. Date: Dec. 3, 2020

(65) Prior Publication Data
US 2022/0211041 A1    Jul. 7, 2022

(30) Foreign Application Priority Data
May 30, 2019  (JP) ................................ 2019-100981

(51) Int. Cl.
| A01N 47/06 | (2006.01) |
| A01N 25/32 | (2006.01) |
| A01N 43/90 | (2006.01) |
| A01P 13/00 | (2006.01) |

(52) U.S. Cl.
CPC .............. *A01N 47/06* (2013.01); *A01N 25/32* (2013.01); *A01N 43/90* (2013.01); *A01P 13/00* (2021.08)

(58) Field of Classification Search
CPC ........ A01N 47/06; A01N 25/32; A01N 43/90; A01P 13/00
See application file for complete search history.

(56) References Cited

U.S. PATENT DOCUMENTS

| 8,846,571 B2 | 9/2014 | Kikugawa et al. |
| 2011/0263427 A1 | 10/2011 | Kikugawa et al. |
| 2018/0020664 A1 | 1/2018 | Reddy et al. |

FOREIGN PATENT DOCUMENTS

| CN | 103548848 A | 2/2014 |
| JP | 2010-159247 | 7/2010 |
| JP | 2018-16573 | 2/2018 |
| JP | 2018-24659 | 2/2018 |
| WO | 2010/067895 | 6/2010 |

OTHER PUBLICATIONS

International Search Report issued in International Patent Application No. PCT/JP2020/019678, dated Jul. 21, 2020, along with an English translation thereof.
International Preliminary Report on Patentability issued with respect to Patent Application No. PCT/JP2020/019678, dated Nov. 16, 2021.
Metzger et al., "Tolpyralate Efficacy: Part 1. Biologically Effective Dose of Tolpyralate for Control of Annual Grass and Broadleaf Weeds in Corn", Weed Technology, vol. 32, Issue 6, Dec. 2018, pp. 698-706.
Office Action issued in the corresponding Indian Application No. 202117053926, dated Jul. 26, 2023, along with English translation thereof.

*Primary Examiner* — Zohreh A Fay
(74) *Attorney, Agent, or Firm* — GREENBLUM & BERNSTEIN, P.L.C.

(57) ABSTRACT

At present, many herbicidal compositions have been developed and used, but there are many types of weeds to be controlled, and their development lasts for a long period of time. Accordingly, it has been desired to develop a herbicidal composition having a wider herbicidal spectrum, high activity and residual activity and thereby capable of controlling undesired plants for a long period of time.
The present invention provides a herbicidal composition comprising as active ingredients (a) tolpyralate and (b) pyroxsulam.

12 Claims, No Drawings

HERBICIDAL COMPOSITION

TECHNICAL FIELD

The present invention relates to a herbicidal composition comprising as active ingredients tolpyralate and pyroxsulam. The present invention further relates to a method for controlling undesired plants, which comprises applying herbicidally effective amounts of tolpyralate and pyroxsulam, to the undesired plants or to a place where they grow. The present invention further relates to a mixture containing as active ingredients tolpyralate and pyroxsulam. The present invention still further relates to a combination of tolpyralate and pyroxsulam as active ingredients.

BACKGROUND ART

Patent Document 1 discloses a herbicidal composition which comprises as active ingredients a specific benzoylpyrazole compound and other herbicidal compound. However, Patent Document 1 failed to specifically describe a combination of tolpyralate and pyroxsulam and its effects.

PRIOR ART DOCUMENTS

Patent Documents

Patent Document 1: WO2010/067895

DISCLOSURE OF INVENTION

Technical Problem

At present, many herbicidal compositions have been developed and used, but there are a variety of types of plants to be controlled, and their development lasts for a long period of time. Accordingly, it has been desired to develop a herbicidal composition having a wider herbicidal spectrum and high activity and thereby capable of controlling undesired plants for a long period of time. Further, in recent years, a technique to reduce the dose of the active ingredient has been desired in terms of the environmental load reduction to a place where the herbicide is applied or to a periphery thereof.

Solution to Problem

The present inventors have conducted extensive studies to achieve the above object and as a result, found a combination of herbicidally active ingredients with high applicability. That is, the present invention provides a herbicidal composition comprising as active ingredients (a) tolpyralate and (b) pyroxsulam. The present invention further provides a method for controlling undesired plants, which comprises applying herbicidally effective amounts of (a) tolpyralate and (b) pyroxsulam, to the undesired plants or to a place where they grow. The present invention further provides a mixture containing as active ingredients (a) tolpyralate and (b) pyroxsulam. The present invention still further provides a combination of (a) tolpyralate and (b) pyroxsulam as active ingredients. In this specification, the herbicidal composition, mixture and combination may sometimes be simply referred to as a herbicidal composition.

Advantageous Effects of Invention

The herbicidal composition of the present invention is capable of controlling a wide range of undesired plants emerging in non-agricultural fields or agricultural fields, and is capable of controlling undesired plants for a long period. Further, the herbicidal composition of the present invention is able to exert higher effects as compared with a case where the respective active ingredients are applied individually. As a result, the dose of (a) tolpyralate and (b) pyroxsulam can be reduced, and thus the present invention is very useful in practical application.

DESCRIPTION OF EMBODIMENTS

The herbicidal composition of the present invention comprises as active ingredients (a) tolpyralate and (b) pyroxsulam.

(a) Tolpyralate and (b) pyroxsulam of the present invention may have salts, alkyl esters, hydrates, different crystal forms, various structural isomers, etc., and they are, of course, all included in the present invention.

In the present invention, the mixing weight ratio of (a) tolpyralate to (b) pyroxsulam cannot generally be defined, as it varies depending upon various conditions such as the formulation types of the active ingredients to be mixed, the weather conditions, and the type and the growth state of the plants to be controlled, but is usually from 1:0.001 to 1:20, preferably from 1:0.005 to 1:10, more preferably from 1:0.01 to 1:5, particularly preferably from 1:0.03 to 1:2.

In the present invention, the doses of (a) tolpyralate and (b) pyroxsulam cannot generally be defined, as they vary depending upon various conditions such as the formulation types of the active ingredients to be mixed, the weather conditions, and the type and the growth state of the plants to be controlled. The dose of (a) is usually from 0.5 to 200 g/ha, preferably from 1 to 150 g/ha, more preferably from 5 to 75 g/ha, particularly preferably from 10 to 60 g/ha. The dose of (b) is usually from 0.1 to 150 g/ha, preferably from 1 to 100 g/ha, more preferably from 2.5 to 50 g/ha, particularly preferably from 5 to 30 g/ha.

The herbicidal composition of the present invention has excellent herbicidal effects. The application range extends to non-agricultural fields such as forest land, farm roads, play grounds and factory sites and agricultural fields such as paddy fields, crop plant fields, orchards and mulberry fields. The application method may suitably be selected from soil application, foliar application, water application, etc.

In the present invention, the "undesired plants" include all plants which grow in an undesired place or at an undesitred time. Accordingly, even useful crops are included in the "undesired plants" if they grow in an undesired place or at an undesitred time.

The herbicidal composition of the present invention can be used for controlling various undesired plants or inhibiting their growth, including Gramineae such as barnyardgrass (*Echinochloa crus-galli* L., *Echinochloa oryzicola* vasing), crabgrass (*Digitaria sanguinalis* L., *Digitaria ischaemum* Muhl., *Digitaria adscendens* Henr., *Digitaria microbachne* Henr., *Digitaria horizontalis* Willd.), green foxtail (*Setaria viridis* L.), giant foxtail (*Setaria faberi* Herrm.), yellow foxtail (*Setaria lutescens* Hubb.), goosegrass (*Eleusine indica* L.), wild oat (*Avena fatua* L.), johnsongrass (*Sorghum halepense* L.), quackgrass (*Agropyron repens* L.), alexandergrass (*Brachiaria plantaginea*), guineagrass (*Panicum maximum* Jacq.), paragrass (*Panicum purpurascens*), sprangletop (*Leptochloa chinensis*), red sprangletop (*Leptochloapanicea*), annual bluegrass (*Poa annus* L.), black grass (*Alopecurus myosuroides* Huds.), cholorado bluestem (*Agropyron tsukushiense* (Honda) Ohwi), broadleaf signalgrass (*Brachiaria platyphylla* Nash), southern sandbur (*Cenchrus echinatus* L.), italian ryegrass (*Lolium multiflorum* Lam.), bermudagrass (*Cynodon dactylon* Pers.), violet crabgrass (*Digitaria violascens* Link), knotgrass (*Paspalum distichum* L.), little quakinggrass (*Briza minor* L.), sweet vernalgrass (*Anthoxanthum odoratum* L.), fall panicum (*Panicum dichotomiflorum* Michx), shattercane (*Sorghum bicolor* (L.) Moench), sloughgrass (*Beckmannia syzigachne*), downy brome (*Bromus tectorum* L.), Japanese brome (*Bromus japonicas* Thunb.), ripgut brome (*Bromus rigdus* Roth), Cheat (*Bromus secalinus* L.), hood canarygrass (*Phalaris paradoxa* L.), littlesseed Canarygrass (*Phalaris minor* Retz.), Barley Foxtail (*Hordeum Jubatum*), perennial ryegrass (*Lolium perenne* L.), rescuegrass (*Bromus catharticus* Vahl.), Jointed goatgrass (*Aegilops* cylindrical Host), persian darnel (*Lolium persicum* Boiss. & Hoh), wild proso millet (*Panicum milliaceum* L.), and (windgrass (*Apera spica-venti* (L.) Beauv.));

Cyperaceae such as rice flatsedge (*Cyperus iria* L.), purple nutsedge (*Cyperus rotundus* L.), yellow nutsedge (*Cyperus esculentus* L.), flatsedge (*Cyperus serotinus*), small-flower umbrellaplant (*Cyperus difformis*), slender spikerush (*Eleocharis acicularis*), water chestnut (*Eleocharis kuroguwai*), green kyllinga (*Kyllinga brevifolia* Rottb. var. *leiolepis*), Schoenoplectus *nipponicus*, cosmopolitan bulrush (*Bolboschoenus koshevnikovii*), amur cyperus (*Cyperus microiria* Steud.), and rock bulrush (*Schoenoplectus juncoides* Palla.);

Alismataceae such as Japanese ribbon waparo (*Sagittariapygmaea*), arrow-head (*Sagittaria trifolia*), and narrowleaf waterplantain (*Alisma canaliculatum*);

Pontederiaceae such as monochoria (*Monochoria vaginalis*), and monochoria species (*Monochoria korsakowii*);

Lythraceae such as toothcup (*Rotala india*), and red stem (*Ammannia multiflora*);

Elatinaceae such as long stem waterwort (*Elatine triandra* SCHK.);

Malvaceae such as velvetleaf (*Abutilon theophrasti* MEDIC.), prickly sida (*Sida spinosa* L.), venice mallow (*Hibiscus trionum* L.), and common mallow (*Malva mauritiana* L.);

Asteraceae such as common cocklebur (*Xanthium strumarium* L.), common ragweed (*Ambrosia elatior* L.), thistle (*Breea setosa* (BIEB.) KITAM.), Canada thistle (*Cirsium arvense*), hairy galinsoga (*Galinsoga ciliata* Blake), wild chamomile (*Matricaria chamomilla* L.), fales chamomile (*Tripleurospermum maritimum*(L.), mayweed chamomile (*Anthemis cotula* L.), hairy fleabane (*Conyza bonariensis* (L.) Cron.), tall fleabane (*Conyza sumatrensis*), tall goldenrod (*Solidago altissima* L.), Prickly lettuce (*Lactuca serriola* L.), philadelphia fleabane (*Erigeron philadelphicus* L.), annual fleabane (*Erigeron annuus*(L.) Pers.), common groundsel (*Senecio vulgaris* L.), giant ragweed (*Ambrosia trifida* L.), horseweed (*Conyza canadensis*(L.) Cron.), dandelion (*Taraxacum officinale*), devils beggarticks (*Bidens frondosa* L.), *Bidens biternate* (Lour.) Merr.et Sherff, Jerusalem artichoke (*Helianthus tuberosus*), pineappleweed (*Matricaria matricarioides* (Less.) Porter), annual sowthistle (*Sonchus oleraceus* L.), sunflower (*Helianthus annuus*), western salsify (*Tragopogon dubius*), absinth wormwood (*Artemisia absinthium* L.), and narrowleaf hawksbeard (*Crepis tectorum* L.); Solanaceae such as black nightshade (*Solanum nigrum* L.), eastern black nightshade (*Solanum ptycanthum* Dun.), hairy nightshade (*Solanum sarrachoides*), Jimsonweed (*Datura stramonium* L.), cutleaf groundcherry (*Physalis angulate* L. var. *angulata*), and horsenettle (*Solanum carolinense* L.);

Amaranthaceae such as slender amaranth (*Amaranthus viridis* L.), redroot pigweed (*Amaranthus retroflexus* L.), prostrate pigweed (*Amaranthus blitoides*), livid amaranth (*Amaranthus blitum* L.), *Achyranthes bidentata* Blume var. *japonica* Miq., *Amaranthus palmeri* S. Watson, Kochia (*Kochia scoparia* L.), smooth pigweed (*Amaranthus hybridus* L.), slender amaranth (*Amaranthus viridis* L.), powell amaranth (*Amaranthus powellii* S. Watson), spiny amaranth (*Amaranthus spinosus* L.), clammy goosefoot (*Dyspharina pumilio*(R.Br.)), common lambsquarters (*Chenopodium album* L.), *Chenopodium album* L. var. *centrorubrum* Makino), russian thistle (*Salsola tragus* L.), common waterhemp (*Amaranthus tamariscinus* Nutt.), and tall waterhemp (*Amaranthus tuberculatus* (Moq.) Sauer));

Polygonaceae such as pale smartweed (*Persicaria lapathifolia* (L.) Delarbre var. *lapathifolia*, *Persicaria lapathifolia* (L.) Delarbre var. *incana* (Roth) H. Hara), ladysthumb (*Polygonum persicaria* L.), wild buckwheat (*Polygonum convolvulus* L.), knotweed (*Polygonum aviculare* L.), Japanese knotweed (*Fallopia japonica* (Houtt.) Ronse Decr. var. *japonica*), *Persicaria longiseta* (Bruiln) Kitag., red sores (*Rumex acetosella* L. subsp. *pyrenaicus*), *Persicaria thunbergii*, *Persicaria nepalensis*(Meisn.) H. Gross, *Rumex Japonicus* Houtt, curly dock (*Rumex crispus* L.), and prostrate knotweed (*Polygonum aviculare* L.);

Brassicaceae such as flexuous bittercress (*Cardamine flexuosa* WITH.), shepherd's-purse (*Capsella bursa-pastoris* Medik.), indian mustard (*Brassica juncea* Czern.), black mustard (*Brassica nigra* L.), *Rorippa indica* (L.), wild mustard (*Sinapis arvensis* L.), marsh yellowcress (*Rorippa palustris* (L.), Bushy wallflower (*Erysimum repandum* L.), volunteer canola (*Brassica napus* L.), field pennycress (*Thlaspi arvense* L.), blue mustard (*Chorispora tenella* (Pallas) DC.), tumble mustard (*Sisymbrium altissimum* L.), wormseed mustard (*Erysimum cheiranthoides* L.), Virginia pepperweed (*Lepidium virginicum* L.), wild radish (*Raphanus raphanistrum* L.), swinecress (*Coronopus didymus* (L.) Sm.)), smallseed falseflax (*Camelina microcarpa* Andrz. et DC.), pinnate tansymustard (*Descurainia pinnata* (Walt.) Britton), bushy wallflower (*Erysimum repandum* L.), and London rocket (*Sisymbrium irio* L.));

Convolvulaceae such as tall morningglory (*Ipomoea purpurea* L.), field bindweed (*Calystegia arvensis* L.), and ivyleaf morningglory (*Ipomoea hederacea* Jacq.);

Portulacaceae such as common purslane (*Portulaca oleracea* L.);

Fabaceae such as sicklepod (*Cassia obtusifolia* L.), red clover (*Trifolium pretense* L.), narrowleaf vetch (*Vicia sativa* L. subso. *nigra* (L.), Ehrh. var. segetalis (Thuill.) Ser.), white clover (*Trifolium repens* L.), tiny vetch (*Vicia hirsute* (L.), *Medicago sativa* L., black medic (*Medicago lupulina* L.), common lespedeza (*Kummerowia striata* (Thunb.) Schindl), smallhop clover (*Trifolium dubium* Sibth), birdsfoot trefoil (*Lotus corniculatus* L. var. *japonicus* Regel), hairy vetch (*Vicia villosa* Roth), and lentil (*Lens culinaris*);

Caryophyllaceae such as common chickweed (*Stellaria media* L.), water starwort (*Stellaria aquatica* (L.), sticky chickweed (*Cerastium glomeratum* Thuill.), *Sagina japonica* (Se.) Ohwi, *Stellaria uliginosa* Murray var. *undulata*, cone catchfly (*Silene conoidea* L.), and nightflowering catchfly (*Silene noctiflora* L.));

Lamiaceae such as henbit (*Lamium amplexicaule* L.), purple deadnettle (*Lamium purpureum* L.), common hempnettle (*Galeopsis tetrahit* L.), and lanceleaf sage (*Salvia reflexa* Hornem));

Rubiaceae such as catchweed (*Galium spurium* L.);

Euphorbiaceae such as threeseeded copperleaf (*Acalypha australis* L.), and spotted spurge (*Euphorbia maculate* L.);

Commelinaceae such as common asiatic dayflower (*Commelina communis* L.);

Linderniaceae such as false pimpernel (*Lindernia procumbens*), false pimpernel (*Lindernia dubia* (L.) Pennell subsp. *major Pennell*), false pimpernel (*Lindernia dubia* (L.) Pennell subsp. *dubia*), and *Lindernia micrantha* D. Don;

Plantaginaceae such as dopatrium (*Dopatrium junceum*), *Gratiola japonica* Miq, *Plantago asiatica* L., buckhorn plantain (*Plantago lanceolate* L.), persian speedwell (*Veronica persica* Poir.), and corn speedwell (*Veronica arvensis* L.);

Geraniaceae such as carolina geranium (*Geranium carolinianum* L.), and redstem filaree (*Erodium cicutarium* (L.) L'Her);

Boraginaceae such as corn gromwell (*Buglossoides arvensis* (L.) I. M. Johnst.), and coast fiddleneck (*Amsinckia intermedia* Fisch.);

Onagraceae such as cutleaf evening primrose (*Oenothera laciniata* Hill.); Apiaceae such as Flixweed (*Descurainia sophia* (L.) Webb ex Prantl.);

Zygophyllaceae such as puncturevine (*Tribulus terrestris* L.); Papaveraceae such as horned poppy (*Glaucium flavum* Crantz); and the like.

The herbicidal composition of the present invention is useful for controlling undesired plants or inhibiting their growth, including Gramineae such as barnyardgrass (*Echinochloa crus-galli* L., *Echinochloa oryzicola* vasing.), crabgrass (*Digitaria sanguinalis* L., *Digitaria ischaemum* Muhl., *Digitaria adscendens* Henr., *Digitaria microbachne* Henr., *Digitaria horizontalis* Willd.), green foxtail (*Setaria viridis* L.), giant foxtail (*Setaria faberi* Herrm.), yellow foxtail (*Setaria lutescens* Hubb.), goosegrass (*Eleusine indica* L.), wild oat (*Avena fatua* L.), sprangletop (*Leptochloa chinensis*), annual bluegrass (*Poa annus* L.), black grass (*Alopecurus myosuroides* Huds.), italian ryegrass (*Lolium multiflorum* Lam.), violet crabgrass (*Digitaria violascens* Link), fall panicum (*Panicum dichotomiflorum* Michx), sloughgrass (*Beckmannia syzigachne*), downy brome (*Bromus tectorum* L.), Japanese brome (*Bromus japonicas* Thunb.), ripgut brome (*Bromus rigdus* Roth), Cheat (*Bromus secalinus* L.), hood canarygrass (*Phalaris paradoxa* L.), littleseeded Canarygrass (*Phalaris minor* Retz.), Barley Foxtail (*Hordeum Jubatum*), and rescuegrass (*Bromus catharticus* Vahl.);

Cyperaceae such purple nutsedge (*Cyperus rotundus* L.), and green kyllinga (*Kyllinga brevifolia* Rottb. var. *leiolepis*);

Malvaceae such as velvetleaf (*Abutilon theophrasti* MEDIC.);

Asteraceae such as common ragweed (*Ambrosia elatior* L.), hairy galinsoga (*Galinsoga ciliata* Blake), tall fleabane (*Conyza sumatrensis*), philadelphia fleabane (*Erigeron philadelphicus* L.), and horseweed (*Conyza canadensis* (L.) Cron.);

Solanaceae such as black nightshade (*Solanum nigrum* L.);

Amaranthaceae such as redroot pigweed (*Amaranthus retroflexus* L.), livid amaranth (*Amaranthus blitum* L.), Kochia (*Kochia scoparia* L.), common lambsquarters (*Chenopodium album* L.), and russian thistle (*Salsola tragus* L.);

Polygonaceae such as pale smartweed (*Persicaria lapathifolia* (L.) Delarbre var. *lapathifolia, Persicaria lapathifolia* (L.) Delarbre var. *incana* (Roth) H. Hara), *Persicaria longiseta* (Bruiln) Kitag., *Persicaria nepalensis*(Meisn.) H. Gross, and wild buckwheat (*Polygonum convolvulus* L);

Brassicaceae such as flexuous bittercress (*Cardamine flexuosa* WITH.), shepherd's-purse (*Capsella bursa-pastoris* Medik.), black mustard (*Brassica nigra* L.), marsh yellowcress (*Rorippa palustris*(L.), field pennycress (*Thlaspi arvense* L.), blue mustard (*Chorispora tenella* (Pallas) DC.), wormseed mustard (*Erysimum cheiranthoides* L.), pinnate tansymustard (*Descurainia pinnata* (Walt.) Britton), and bushy wallflower (*Erysimum repandum* L.);

Portulacaceae such as common purslane (*Portulaca oleracea* L.); Fabaceae such as narrowleaf vetch (*Vicia sativa* L. subso. *nigra* (L.), Ehrh.var.segetalis (Thuill.) Ser.), common lespedeza (*Kummerowia striata* (Thunb.) Schindl), and hairy vetch (*Vicia villosa* Roth);

Caryophyllaceae such as common chickweed (*Stellaria media* L.), and sticky chickweed (*Cerastium glomeratum* Thuill.);

Lamiaceae such as henbit (*Lamium amplexicaule* L.);

Rubiaceae such as catchweed (*Galium spurium* L.);

Commelinaceae such as common asiatic dayflower (*Commelina communis* L.);

Plantaginaceae such as persian speedwell (*Veronica persica* Poir.);

Boraginaceae such as coast fiddleneck (*Amsinckia intermedia* Fisch.);

Apiaceae such as Flixweed (*Descurainia sophia* (L.) Webb ex Prantl.); and the like.

The herbicidal composition of the present invention is particularly useful for controlling undesired plants or inhibiting their growth, over a long period, the undesired plants including so-called winter weeds, such as wild oat (*Avena fatua* L.), black grass (*Alopecurus myosuroides* Huds.), italian ryegrass (*Lolium multiflorum* Lam.), Kochia (*Kochia scoparia* L.), and common chickweed (*Stellaria media* L.), which grow in winter.

The herbicidal composition of the present invention can be used for selectively controlling the above undesired plants or inhibiting their growth in cultivation of useful crops such as lawn, soybean (*Glycine max* (L.) Merrill), cotton (*Gossypium* spp.), wheat (*Triticum aestivum* (L.) Thell.), barley (*Hordeum vulgare* L.), rye (*Secale cereale* L.), rye wheat, pastures (such as orchardgrass (*Dactylis glomerata* L.), timothy (*Phleum pratense* L.), perennial ryegrass (*Lolium perenne* L.), alfalfa (*Medicago sativa* L.), and red clover (*Trifolium pratense* L.)), oat (*Avena sativa* L.), rice (*Oryza sativa* L.), corn (*Zea mays* L.), sorghum (Sorghum spp.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tobacco (*Nicotiana tabacum*, L.) and coffee (*Coffea arabica*). Accordingly, the herbicidal composition of the present invention is preferably used in a place where the above useful crops grow.

The herbicidal composition of the present invention is preferably used particularly in a place where useful crops such as lawn, soybean, cotton, wheat, barley, rye, rye wheat, pastures, rice, corn, rape, rapeseed, sunflower, sugar beet, sugarcane, peanut, flax, tobacco and coffee grow, especially in a place where lawn, wheat, barley, rye, rye wheat, pastures, corn and the like grow.

The useful crops in the present invention include plants having, imparted by classical breeding methods, resistance to a herbicide, for example, a HPPD inhibitor such as isoxaflutole; an ALS inhibitor such as imazethapyr or thifensulfuron-methyl; an EPSP synthase inhibitor such as glyphosate; a glutamine synthase inhibitor such as glufosinate; an acetyl CoA carboxylase inhibitor such as sethoxydim; bromoxynil;

dicamba; or 2,4-D. The useful crops may, for example, be specifically imidazolinone herbicide resistant corn and canola (tradename: Clearfield™); and STS soybean resistant to sulfonylurea ALS inhibitor type herbicides.

The useful crops in the present invention include transgenic plants generated by gene modification. Examples of the transgenic plants include herbicide-resistant transgenic plants, noxious insect-resistant transgenic plants, transgenic plants relating to plant components, and phytopathogen-resistant transgenic plants. Further, the useful crops of the present invention include stacked varieties having useful characters of such transgenic plants combined.

The herbicidal composition of the present invention can be effectively used for selectively controlling undesired plants or inhibiting their growth in cultivation of various transgenic plants of the above useful crops (such as soybean, cotton, rapeseed and corn).

The herbicide-resistant transgenic plants include glyphosate-resistant corn, soybean, cotton, rapeseed and sugar beet, glufosinate-resistant corn, soybean, cotton and rapeseed, and bromoxynil-resistant cotton.

The noxious insect-resistant transgenic plants include, for example, plants which have acquired the ability to synthesize e.g. toxins known to be synthesized by the genus Bacillus. Toxins synthesized by the transgenic plants impart to the plants resistance particularly to Coleoptera insects, Hemiptera insects, Diptera insects, Lepidoptera insects and nematodes.

The above toxins include insecticidal proteins derived from Bacillus cereus and Bacillus popilliae; δ-endotoxins derived from Bacillus thuringiensis, such as Cry1Ab, Cry1Ac, Cry1F, Cry1Fa2, Cry2Ab, Cry3A, Cry3Bb1 and Cry9C; insecticidal proteins such as VIP1, VIP2, VIP3 and VIP3A; insecticidal proteins derived from nematodes; toxins produced by animals, such as scorpion toxin, spider toxin, bee toxin and insect-specific neurotoxin; filamentous fungi toxin; plant lectin; agglutinin; protease inhibitors such as trypsin inhibitor, serine protease inhibitor, patatin, cystatin and papain inhibitor; ribosome-inactivating proteins (RIP) such as ricin, corn-RIP, abrin, luffin, saporin and bryodin; steroid metabolizing enzymes such as 3-hydroxysteroid oxidase, ecdysteroid-UDP-glucosyltransferase and cholesterol oxidase; ecdysone inhibitor; HMG-CoA reductase; ion channel blockers such as sodium channel blocker and calcium channel blocker; juvenile hormone esterase; diuretic hormone receptor; stilbene synthase; bibenzyl synthase; chitinase; and glucanase. Further, such toxins include hybrid toxins of δ-endotoxin proteins such as Cry1Ab, Cry1Ac, Cry1F, Cry1Fa2, Cry2Ab, Cry3A, Cry3Bb1, Cry9C, Cry34Ab and Cry35Ab, and insecticidal proteins such as VIP1, VIP2, VIP3 and VIP3A, toxins lacking part thereof, and modified toxins.

The transgenic plants relating to plant components include plants having imparted oil component modified character or amino acid content increased character.

The phytopathogen-resistant transgenic plants include plants having imparted the ability to produce anti-pathogen substances with selective action.

The transgenic plants are not particularly limited and may, for example, be specifically corn, soybean, cotton, rapeseed and sugar beet varieties resistant to glyphosate (tradename: RoundupReady™, Agrisure™, Gly-Tol™); corn, soybean, cotton and rapeseed varieties resistant to glufosinate (tradename: LibertyLink™); cotton variety resistant to bromoxynil (tradename: BXN); corn and soybean varieties resistant to both glyphosate and ALS inhibitors (tradename: Optimum™, GAT™); imidazolinone compound resistant variety (tradename: IMI™); corn variety expressing Cry1Ab toxin (tradename: YieldGard™); corn variety expressing Cry3Bb1 toxin (tradename: YieldGard Rootworm™); corn variety expressing Cry1Ab and Cry3Bb1 toxins (tradename: YieldGard Plus™); corn variety expressing Cry1Fa2 toxin and phosphinothricin N-acetyltransferase (PAT) for imparting resistance to glufosinate (tradename: Herculex I™); cotton variety expressing Cry1Ac toxin (tradename: NuCOTN33B™, Bollgard I™); cotton variety expressing Cry1Ac and Cry2Ab toxin (tradename: Bollgard II™); cotton variety expressing VIP toxin (tradename: VIP-COT™); corn variety expressing Cry1Fa2 toxin and phosphinothricin N-acetyltransferase (PAT) for imparting resistance to glufosinate (Herculex I™); variety having GA21 glyphosate-resistant character (tradename: NatureGard Agrisure GT Advantage™); variety having Bt11 corn borer (CB) character (tradename: Agrisure CB Advantage™); low linolenic acid soybean having reduced linolenic acid content (tradename: VISTIVE™); and corn variety having increased lysine or oil content.

The herbicidal composition of the present invention, which comprises the above specific (a) tolpyralate and (b) pyroxsulam in combination, exerts, as compared with a case where the respective active ingredients are applied individually, higher effects, which last over a long period of time. Thus, it is very useful in practical application, for example, in an application where the effects of the herbicidal composition may decrease by rainfall after the application or by the influence of the temperature, etc.

In the present invention, in addition to (a) tolpyralate and (b) pyroxsulam, as the case requires, other herbicidal compound may be mixed and used. Such other herbicidal compound may suitably be selected from among various known herbicidal compounds, considering the application of the herbicidal composition, and the type and the growth state of the undesired plants to be controlled. Further, the herbicidal composition of the present invention may be mixed with or used in combination with a fungicide, an antibiotic, a plant hormone, an insecticide, a fertilizer and a safener, whereby more excellent effects or function may be obtained in some cases. It is particularly useful to use (a) tolpyralate and (b) pyroxsulam as mixed with or in combination with (c) one component or two or more components (for example, three components or four components) selected from the group consisting of other herbicidal compound and a safener. The mixing weight ratio of (a) tolpyralate, (b) pyroxsulam and (c) one component or two or more components selected from the group consisting of other herbicidal compound and a safener cannot generally be defined, as it varies depending upon various conditions such as the formulation types of the active ingredients to be mixed, the weather conditions, and the type and the growth state of the plants to be controlled, but is, by the weight ratio of (a):(b):(c), usually from 1:0.001:0.001 to 1:20:80, preferably from 1:0.005:0.01 to 1:10:60. Further, the mixing weight ratio of (a), (b), (c) other herbicidal compound and (c) safener is usually from 1:0.001:0.05:0.001 to 1:20:80:20, preferably from 1:0.005:0.1:0.01 to 1:10:60:10. Further, in the present invention, the dose of (c) selected from the group consisting of other herbicidal compound and a safener cannot generally be defined, as it varies depending upon various conditions such as the formulation types of the active ingredients to be mixed, the weather conditions, and the type and the growth state of the plants to be controlled but is usually from 0.01 to 1,000 g/ha, preferably from 0.1 to 800 g/ha.

Such other herbicidal compound includes, for example, the following compounds (common names), and one component or two or more components may properly be selected.

(1) Compounds which are believed to exhibit herbicidal effects by disturbing hormone activities of plants, such as a phenoxy compound such as 2,4-D, 2,4-D-butotyl, 2,4-D-butyl, 2,4-D-dimethylammonium, 2,4-D-diolamine, 2,4-D-ethyl, 2,4-D-2-ethylhexyl, 2,4-D-isobutyl, 2,4-D-isoctyl, 2,4-D-isopropyl, 2,4-D-isopropylammonium, 2,4-D-sodium, 2,4-D-isopropanolammonium, 2,4-D-trolamine, 2,4-DB, 2,4-DB-butyl, 2,4-DB-dimethylammonium, 2,4-DB-isoctyl, 2,4-DB-potassium, 2,4-DB-sodium, 2,4-D choline salt, dichlorprop, dichlorprop-butotyl, dichlorprop-dimethylammonium, dichlorprop-isoctyl, dichlorprop-potassium, dichlorprop-P, dichlorprop-P-dimethylammonium, dichlorprop-P-potassium, dichlorprop-P-sodium, MCPA, MCPA-butotyl, MCPA-dimethylammonium, MCPA-2-ethylhexyl, MCPA-potassium, MCPA-sodium, MCPA-thioethyl, MCPB, MCPB-ethyl, MCPB-sodium, mecoprop, mecoprop-butotyl, mecoprop-sodium, mecoprop-P, mecoprop-P-butotyl, mecoprop-P-dimethylammonium, mecoprop-P-2-ethylhexyl, mecoprop-P-potassium, naproanilide, clomeprop, or HIA-1; an aromatic carboxylic acid compound such as 2,3,6-TBA, dicamba, dicamba-butotyl, dicamba-diglycolamine, dicamba-dimethylammonium, dicamba-diolamine, dicamba-isopropylammonium, dicamba-potassium, dicamba-sodium, picloram, picloram-dimethylammonium, picloram-isoctyl, picloram-potassium, picloram-triisopropanolammonium, picloram-triisopropylammonium, picloram-trolamine, triclopyr, triclopyr-butotyl, triclopyr-triethylammonium, clopyralid, clopyralid-olamine, clopyralid-potassium, clopyralid-triisopropanolammonium, aminopyralid, aminocyclopyrachlor, halauxifen, halauxifen-methyl, or DAS-534; and naptalam, naptalam-sodium, benazolin, benazolin-ethyl, quinclorac, quinmerac, diflufenzopyr, diflufenzopyr-sodium, fluroxypyr, fluroxypyr-2-butoxy-1-methylethyl, fluroxypyr-meptyl, chlorflurenol, chlorflurenol-methyl, or clacyfos.

(2) Compounds which are believed to exhibit herbicidal effects by inhibiting photosynthesis of plants, such as a urea compound such as chlorotoluron, diuron, fluometuron, linuron, isoproturon, metobenzuron, tebuthiuron, dimefuron, isouron, karbutilate, methabenzthiazuron, metoxuron, metobromuron, monolinuron, neburon, siduron, terbumeton or trietazine; a triazine compound such as simazine, atrazine, atratone, simetryn, prometryn, dimethametryn, hexazinone, metribuzin, terbuthylazine, cyanazine, ametryn, cybutryne, terbutryn, propazine, metamitron, or prometon; a uracil compound such as bromacil, bromacil-lithium, lenacil or terbacil; an anilide compound such as propanil, cypromid or tethupyrolimet; a carbamate compound such as swep, desmedipham or phenmedipham; a hydroxybenzonitrile compound such as bromoxynil, bromoxynil-octanoate, bromoxynil-heptanoate, ioxynil, ioxynil-octanoate, ioxynil-potassium or ioxynil-sodium; and pyridate, bentazone, bentazone-sodium, amicarbazone, methazole, pentanochlor or phenmedipham.

(3) Quaternary ammonium salt compound such as paraquat or diquat, which is believed to be converted to free radicals by itself to form active oxygen in the plant and show rapid herbicidal efficacy.

(4) Compounds which are believed to exhibit herbicidal effects by inhibiting chlorophyll biosynthesis of plants and abnormally accumulating a photosensitizing peroxide substance in the plant, such as a diphenylether compound such as nitrofen, chlomethoxyfen, bifenox, acifluorfen, acifluorfen-sodium, fomesafen, fomesafen-sodium, oxyfluorfen, lactofen, aclonifen, ethoxyfen-ethyl, fluoroglycofen-ethyl or fluoroglycofen; a cyclic imide compound such as chlorphthalim, flumioxazin, flumiclorac, flumiclorac-pentyl, cinidon-ethyl, fluthiacet-methyl, or EK-5385; and oxadiargyl, oxadiazon, sulfentrazone, carfentrazone-ethyl, thidiazimin, pentoxazone, azafenidin, isopropazole, pyraflufen-ethyl, benzfendizone, butafenacil, saflufenacil, epyrifenacil, fluazolate, profluazol, flufenpyr-ethyl, bencarbazone, tiafenacil, pyrachlonil, cyclopyranil, trifludimoxazin, HNPC-B4047, IR-6396, EK-5439, EK-5498, SYN-523, or a compound disclosed in WO2008/008763 (FMC CORPORATION).

(5) Compounds which are believed to exhibit herbicidal effects characterized by bleaching activities by inhibiting chromogenesis of plants such as carotenoids, such as a pyridazinone compound such as norflurazon, chloridazon or metflurazon; a pyrazole compound such as pyrazolynate, pyrazoxyfen, benzofenap, topramezone, cypyrafluone or bipyrazone; and amitrole, fluridone, flurtamone, diflufenican, methoxyphenone, clomazone, bixlozone, mesotrione, tefuryltrione, tembotrione, fenquinotrione, cyclopyrimorate, difenzoquat, difenzoquat-metilsulfate, isoxachlortole, benzobicyclon, bicyclopyrone, picolinafen, beflubutamid, ketospiradox or ketospiradox-potassium.

(6) Compounds which are believed to exhibit herbicidal effects by inhibiting a fatty acid biosynthesis of plants, such as an aryloxyphenoxypropionic acid compound such as diclofop-methyl, diclofop, pyriphenop-sodium, fluazifop-butyl, fluazifop, fluazifop-P, fluazifop-P-butyl, haloxyfop-methyl, haloxyfop, haloxyfop-etotyl, haloxyfop-P, haloxyfop-P-methyl, quizalofop-ethyl, quizalofop-P, quizalofop-P-ethyl, quizalofop-P-tefuryl, cyhalofop-butyl, fenoxaprop-ethyl, fenoxaprop-P, fenoxaprop-P-ethyl, clodinafop-propargyl, clodinafop, propaquizafop, HNPC-A8169 or SYP-1924; a cyclohexanedione compound such as alloxydim-sodium, alloxydim, clethodim, sethoxydim, tralkoxydim, butroxydim, tepraloxydim, profoxydim or cycloxydim; and a phenylpyrazoline compound such as pinoxaden.

(7) Compounds which are believed to exhibit herbicidal effects by inhibiting an amino acid biosynthesis of plants, such as a sulfonylurea compound such as chlorimuron-ethyl, chlorimuron, sulfometuron-methyl, sulfometuron, primisulfuron-methyl, primisulfuron, bensulfuron-methyl, bensulfuron, chlorsulfuron, metsulfuron-methyl, metsulfuron, cinosulfuron, pyrazosulfuron-ethyl, pyrazosulfuron, flazasulfuron, rimsulfuron, nicosulfuron, imazosulfuron, flucetosulfuron, cyclosulfamuron, prosulfuron, flupyrsulfuron-methyl-sodium, flupyrsulfuron, triflusulfuron-methyl, triflusulfuron, halosulfuron-methyl, halosulfuron, thifensulfuron-methyl, thifensulfuron, ethoxysulfuron, oxasulfuron, ethametsulfuron, ethametsulfuron-methyl, iodosulfuron, iodosulfuron-methyl-sodium, sulfosulfuron, triasulfuron, tribenuron-methyl, tribenuron, tritosulfuron, foramsulfuron, trifloxysulfuron, trifloxysulfuron-sodium, mesosulfuron-methyl, mesosulfuron, orthosulfamuron, amidosulfuron, azimsulfuron, propyrisulfuron, metazosulfuron, methiopyrsulfuron, monosulfuron-methyl, orsosulfuron, iofensulfuron or iofensulfuron-sodium; a triazolopyrimidinesulfonamide compound such as flumetsulam, metosulam, dimesulfazet, diclosulam, cloransulam-methyl, florasulam or penoxsulam; an imidazolinone compound such as imazapyr, imazapyrisopropylammonium, imazethapyr, imazethapyr-ammonium, imazaquin, imazaquin-ammonium, imazamox, imazamox-ammonium, imazamethabenz, imazamethabenz-methyl or imazapic; a pyrimidinylsalicylic acid compound such as pyrithiobac-sodium, bispyribac-sodium, pyriminobac-methyl, pyribenzoxim, pyriftalid, pyrimisulfan, or triafamone; a sulfonylaminocarbonyltriazolinone compound such as flucarbazone, flucarbazone-sodium, propoxycarbazone-sodium, propoxycarbazone, or thiencarbazone-methyl; and glyphosate, glyphosate-sodium, glyphosate-potassium, glyphosate-ammonium, glyphosate-diammonium, glyphosate-isopropylammonium, glyphosate-trimesium, glyphosate-sesquisodium, glufosinate, glufosinate-ammonium, glufosinate-P, glufosinate-P-ammonium, glufosinate-P-sodium, bilanafos, bilanafos-sodium or cinmethylin.

(8) Compounds which are believed to exhibit herbicidal effects by inhibiting cell mitoses of plants, such as a dinitroaniline compound such as trifluralin, oryzalin, nitralin, pendimethalin, ethalfluralin, benfluralin, prodiamine, butralin or dinitramine; an amide compound such as bensulide, napropamide, napropamide-M, propyzamide, pronamide or beflubutamid-M; an organic phosphorus compound such as amiprofos-methyl, butamifos, anilofos or piperophos; a phenyl carbamate compound such as propham, chlorpropham, barban or carbetamide; a cumylamine compound such as daimuron, cumyluron, bromobutide or methyldymron; and asulam, asulam-sodium, dithiopyr, thiazopyr, chlorthal-dimethyl, chlorthal, diphenamid, flamprop-M-methyl, flamprop-M, or flamprop-M-isopropyl.

(9) Compounds which are believed to exhibit herbicidal effects by inhibiting protein biosynthesis or lipid biosynthesis of plants, such as a chloroacetamide compound such as alachlor, metazachlor, butachlor, pretilachlor, metolachlor, S-metolachlor, thenylchlor, pethoxamid, acetochlor, propachlor, dimethenamide, dimethenamide-P, propisochlor or dimethachlor; a thiocarbamate compound such as molinate, dimepiperate, pyributicarb, EPTC, butylate, vernolate, pebulate, cydoate, prosulfocarb, esprocarb, thiobencarb, diallate, tri-allate or orbencarb; and etobenzanid, mefenacet, flufenacet, tridiphane, fentrazamide, infanofan, oxaziclomefone, benfuresate, pyroxasulfone, dalapon, dalapon-sodium, TCA-sodium or trichloroacetic acid.

(10) Compounds which are believed to exhibit herbicidal effects by inhibiting a cellulose biosynthesis of plants, such as dichlobenil, triaziflam, indaziflam, flupoxam, or isoxaben.

(11) MSMA, DSMA, CMA, endothall, endothall-dipotassium, endothall-sodium, endothall-mono(N,N-dimethylalkylammonium), ethofumesate, sodium chlorate, pelargonic acid, nonanoic acid, fosamine, fosamine-ammonium, ipfencarbazone, aclolein, ammonium sulfamate, borax, chloroacetic acid, sodium chloroacetate, cyanamide, methylarsonic acid, dimethylarsinic acid, sodium dimethylarsinate, dinoterb, dinoterb-ammonium, dinoterb-diolamine, dinoterb-acetate, DNOC, ferrous sulfate, flupropanate, flupropanate-sodium, mefluidide, mefluidide-diolamine, metam, metam-ammonium, metam-potassium, metam-sodium, methyl isothiocyanate, pentachlorophenol, sodium pentachlorophenoxide, pentachlorophenol laurate, quinoclamine, sulfuric acid, urea sulfate, xanthinosin, herbimycin, unguinol, metatyrosine, sarmentine, thaxtomin A, mevalocidin, alpha-limonene, pyribambenz-propyl, pyribambenz-isopropyl, JS-913, KHG-23844, H-9201, SIOC-0163, SIOC-0171, SIOC-0172, SIOC-0285, SIOC-0426, SIOC-H-057, ZJ-0166, ZJ-1835, ZJ-0453, ZJ-0777, ZJ-0862, a compound disclosed in WO2008/096398 (Kumiai Chemical) or the like.

(12) Those which are believed to exhibit herbicidal effects by being parasitic on plants, such as *Xanthomonas campestris, Epicoccosirus nematosorus, Epicoccosirus nematosperus, Exserohilum monoseras*, or *Drechsrela monoceras*.

One compound or two or more compounds (for example, three compounds or four compounds) may properly be selected from among the above other herbicidal compounds. The other herbicidal compound is not limited to the above. Other herbicidal compound which may be mixed with or used in combination with (a) tolpyralate and (b) pyroxsulam may, for example, be compounds which are believed to exhibit herbicidal effects by inhibiting protein biosynthesis or lipid biosynthesis of plants, such as a hydroxybenzonitrile compound such as bromoxynil, bromoxynil-octanoate, bromoxynil-heptanoate, ioxynil, ioxynil-octanoate, ioxynil-potassium or ioxynil-sodium; a thiocarbamate compound such as molinate, dimepiperate, pyributicarb, EPTC, butylate, vernolate, pebulate, cycloate, prosulfocarb, esprocarb, thiobencarb, diallate, tri-allate or orbencarb; and etobenzanid, mefenacet, flufenacet, tridiphane, fentrazamide, indanofan, oxaziclomefone, benfuresate, pyroxasulfone, dalapon, dalapon-sodium, TCA-sodium or trichloroacetic acid. Other herbicidal compound is more preferably bromoxynil, bromoxynil-octanoate and bromoxynil-heptanoate, more preferably bromoxynil-octanoate and bromoxynil-heptanoate, particularly preferably bromoxynil-octanoate.

The mixing ratio of (a) tolpyralate, (b) pyroxsulam and (c) other herbicidal compound in a case where (c) is a herbicidal compound alone, cannot generally be defined, as it varies depending upon various conditions such as the formulation types of the active ingredients to be mixed, the weather conditions, and the type and the growth state of the plants to be controlled, but is, by the weight ratio of (a):(b):(c), usually from 1:0.001:0.05 to 1:20:80, preferably from 1:0.005:0.1 to 1:10:60, more preferably from 1:0.01:1 to 1:5:30, particularly preferably from 1:0.03:2 to 1:2:20. In the present invention, the dose of (c) other herbicidal compound cannot generally be defined, as it varies depending upon various conditions such as the formulation types of the active ingredients to be mixed, the weather conditions, and the type and the growth state of the plants to be controlled, but is usually from 10 to 1,000 g/ha, preferably from 30 to 800 g/ha, more preferably from 50 to 500 g/ha, particularly preferably from 70 to 300 g/ha.

The (c) safner which may be used as mixed with or in combination with the herbicidal composition of the present invention may be benoxacor, cloquintocet, cloquintcet-acid, cloquintocet mexyl, cyometrinil, cyprosulfamide, dichlormid, dicyclonon, dietholate, fenchlorazole, fenclorim, flurazole, fluxofenim, furilazole, isoxadifen, isoxadifen-ethyl, mefenpyr, mephenate, metcamifen, naphthaleneacetic acid, naphthalic anhydride, oxabetrinil, 4-(dichloroacetyl)-1-oxa-4-azaspiro[4.5]decane, 2,2,5-trimethyl-3-(dichloroacetyl)-1,3-oxazolidine, N-(2-Methoxybenzoyl)-4-[(methylaminocarbonyl)amino]benzenesulfonamide), and agriculturally acceptable salts, esters and amides thereof. One component or two or more components (for example, three components or four components) may suitably be selected from among the above safeners. The safener is not limited to the above. The safter which may be used as mixed with or in combination with (a) tolpyralate and (b) pyroxsulam is preferably cloquintocet, cloquintcet-acid, or cloquintocet mexyl, particularly preferably cloquintocetmexyl.

The mixing ratio of (a) tolpyralate, (b) pyroxsulam and (c) safener in a case where (c) is a safener alone, cannot generally be defined, as it varies depending upon various conditions such as the formulation types of the active ingredients to be mixed, the weather conditions, and the type and the growth state of the plants to be controlled, but is, by the weight ratio of (a):(b):(c), usually from 1:0.001:0.001 to 1:20:20, preferably from 1:0.005:0.01 to 1:10:10, more preferably from 1:0.01:0.05 to 1:5:5, particularly preferably from 1:0.03:0.1 to 1:2:2. The dose of (c) safener in the present invention cannot generally be defined, as it varies depending upon various conditions such as the formulation types of the active ingredients to be mixed, the weather conditions, and the type and the growth state of the plants to be controlled, but is usually from 0.01 to 500 g/ha, preferably from 0.1 to 200 g/ha, more preferably from 0.5 to 100 g/ha, particularly preferably from 1 to 50 g/ha.

With respect to application of the herbicidal composition of the present invention, application to undesired plants or application to a place where they grow (either before or after emerging of the plants) may optionally be selected. Further, (a) tolpyralate and (b) pyroxsulam may separately be formulated so that they are mixed for use at the time of application, or they may be formulated together, followed by application. (a) Tolpyralate and (b) pyroxsulam may be formulated together with a component which can be used as mixed or in combination (for example, other herbicidal compound, a fungicide, an antibiotic, a plant hormone, an insecticide, a fertilizer or a safener). As examples of a specific application method, the following may be mentioned.

1. (a) Tolpyralate and (b) pyroxsulam are formulated together, and the formulation is applied as it is. As the case requires, separately formulated other herbicidal compound, safener or the like may be applied as it is simultaneously or continuously.

2. (a) Tolpyralate and (b) pyroxsulam are formulated together, the formulation is diluted to a predetermined concentration with e.g. water, and as the case requires, an adjuvant (such as a surfactant, a vegetable oil or a mineral oil), separately formulated other herbicidal compound, safener or the like is added for application.

3. (a) Tolpyralate and (b) pyroxsulam are separately formulated and applied as they are. As the case requires, separately formulated other herbicidal compound, safener or the like may be applied as it is simultaneously or continuously.

4. (a) Tolpyralate and (b) pyroxsulam are separately formulated, and they are diluted to a predetermined concentration with e.g. water, and as the case requires, an adjuvant (such as a surfactant, a vegetable oil or a mineral oil), separately formulated other herbicidal compound, safener or the like is added for application.

5. (a) Tolpyralate and (b) pyroxsulam are separately formulated, and the formulations are mixed when diluted to a predetermined concentration with e.g. water, and as the case requires, an adjuvant (such as a surfactant, a vegetable oil or a mineral oil), separately formulated other herbicidal compound, safener or the like is added for application.

6. (a) Tolpyralate and other herbicidal compound, safener and the like are formulated together, and the formulation and separately formulated (b) pyroxsulam are applied as they are.

7. (a) Tolpyralate and other herbicidal compound, safener and the like are formulated together, and the formulation and separately formulated (b) pyroxsulam are diluted to a predetermined concentration with e.g. water, and as the case requires, an adjuvant (such as a surfactant, a vegetable oil or a mineral oil) is added for application.

8. (b) Pyroxsulam and other herbicidal compound, safener and the like are formulated together, and the formulation and separately formulated (a) tolpyralate are applied as they are.

9. (b) Pyroxsulam and other herbicidal compound, safener and the like are formulated together, and the formulation and separately formulated (a) tolpyralate are diluted to a predetermined concentration with e.g. water, and as the case requires, an adjuvant (such as a surfactant, a vegetable oil or a mineral oil) is added for application.

The herbicidal composition of the present invention may be prepared by mixing (a) tolpyralate and (b) pyroxsulam, as active ingredients, with various additives in accordance with conventional formulation methods for agricultural chemicals, and applied in the form of various formulations such as dusts, granules, water dispersible granules, wettable powders, tablets, pills, capsules (including a formulation packaged by a water soluble film), water-based suspensions, oil-based suspensions, microemulsions, suspoemulsions, water soluble powders, emulsifiable concentrates, soluble concentrates or pastes. It may be formed into any formulation which is commonly used in this field, so long as the object of the present invention is thereby met. At the time of the formulation, (a) tolpyralate and (b) pyroxsulam may be formulated together, or they may be separately formulated.

The additives to be used for the formulation include, for example, a solid carrier such as diatomaceous earth, slaked lime, calcium carbonate, talc, white carbon, kaoline, bentonite, kaolinite, sericite, clay, sodium carbonate, sodium bicarbonate, mirabilite, zeolite or starch; a solvent such as water, toluene, xylene, solvent naphtha, dioxane, acetone, isophorone, methyl isobutyl ketone, chlorobenzene, cyclohexane, dimethyl sulfoxide, dimethylformamide, dimethylacetamide, N-methyl-2-pyrrolidone or an alcohol; an anionic surfactant or adjuvant such as a salt of fatty acid, a benzoate, an alkylsulfosuccinate, a dialkylsulfosuccinate, a polycarboxylate, a salt of alkylsulfuric acid ester, an alkyl sulfate, an alkylaryl sulfate, an alkyl diglycol ether sulfate, a salt of alcohol sulfuric acid ester, an alkyl sulfonate, an alkylaryl sulfonate, an aryl sulfonate, a lignin sulfonate, an alkyldiphenyl ether disulfonate, a polystyrene sulfonate, a salt of alkylphosphoric acid ester, an alkylaryl phosphate, a styrylaryl phosphate, a salt of polyoxyethylene alkyl ether sulfuric acid ester, a polyoxyethylene alkylaryl ether sulfate, a salt of polyoxyethylene alkylaryl ether sulfuric acid ester, a polyoxyethylene alkyl ether phosphate, a salt of polyoxyethylene alkylaryl phosphoric acid ester, a salt of polyoxyethylene aryl ether phosphoric acid ester, a naphthalene sulfonate condensed with formaldehyde or an alkylnaphthalene sulfonate condensed with formaldehyde; a nonionic surfactant or adjuvant such as a sorbitan fatty acid ester, a glycerin fatty acid ester, a fatty acid polyglyceride, a fatty acid alcohol polyglycol ether, acetylene glycol, acetylene alcohol, an oxyalkylene block polymer, a polyoxyethylene alkyl ether, a polyoxyethylene alkylaryl ether, a polyoxyethylene styrylaryl ether, a polyoxyethylene glycol alkyl ether, polyethylene glycol, a polyoxyethylene fatty acid ester, a polyoxyethylene sorbitan fatty acid ester, a polyoxyethylene glycerin fatty acid ester, a polyoxyethylene hydrogenated castor oil or a polyoxypropylene fatty acid ester; and a vegetable oil or mineral oil such as olive oil, kapok oil, castor oil, palm oil, camellia oil, coconut oil, sesame oil, corn oil, rice bran oil, peanut oil, cottonseed oil, soybean oil, rapeseed oil, linseed oil, tung oil or liquid paraffins. These additives may suitably be selected for use alone or in combination as a mixture of two or more of them, so long as the object of the present invention is met. Further, various additives commonly used, such as a filler, a thickener, an anti-settling agent, an anti-freezing agent, a dispersion stabilizer, an anti-mold agent, a blowing agent, a disintegrator and a binder, may be used. The mixing ratio of the total of (a) tolpyralate and (b) pyroxsulam to such various additives is, by the weight ratio of the total of (a) and (b):additives, from about 0.1:99.9 to about 95:5, preferably from 0.1:99.9 to 95:5, more preferably from about 0.2:99.8 to about 85:15, further preferably from 0.2:99.8 to 85:15.

Now, examples of preferred embodiments of the present invention will be given below, but it should be understood that the present invention is by no means restricted thereto.

[1] A herbicidal composition (or mixture) comprising as active ingredients (a) tolpyralate and (b) pyroxsulam.

[2] The herbicidal composition (or mixture) according to [1], wherein the mixing weight ratio of (a) to (b) is from 1:0.001 to 1:20.

[3] The herbicidal composition (or mixture) according to [1], wherein the mixing weight ratio of (a) to (b) is from 1:0.03 to 1:2.

[4] The herbicidal composition (or mixture) according to any one of [1] to [3], which further contains (c) one component or two or more components selected from the group consisting of other herbicidal compound and a safener.

[5] The herbicidal composition (or mixture) according to [4], wherein the mixing weight ratio of (a):(b):(c) is from 1:0.001:0.001 to 1:20:80.

[6] The herbicidal composition (or mixture) according to any one of [1] to [3], which further contains (c) one other herbicidal compound or two or more other herbicidal compounds.

[7] The herbicidal composition (or mixture) according to [6], wherein the mixing weight ratio of (a):(b):(c) other herbicidal compound is from 1:0.001:0.05 to 1:20:80.

[8] The herbicidal composition (or mixture) according to any one of [1] to [3], which further contains (c) one safener or two or more safeners.

[9] The herbicidal composition (or mixture) according to [8], wherein the mixing weight ratio of (a):(b):(c) safener is from 1:0.001:0.001 to 1:20:20.

[10] The herbicidal composition (or mixture) according to any one of [1] to [3], which further contains both (c) one other herbicidal compound or two or more other herbicidal compounds and (c) one safener or two or more safeners.

[11] The herbicidal composition (or mixture) according to [10], wherein the mixing weight ratio of (a):(b):(c) other herbicidal compound: (c) safener is from 1:0.001:0.05:0.001 to 1:20:80:20.

[12] The herbicidal composition (or mixture) according to any one of [1] to [11], for controlling undesired plants or inhibiting their growth, the undesired plants being selected from the group consisting of Gramineae, Cyperaceae, Alismataceae, Pontederiaceae, Lythraceae, Elatinaceae, Malvaceae, Asteraceae, Solanaceae, Amaranthaceae, Polygonaceae, Brassicaceae, Convolvulaceae, Portulacaceae, Fabaceae, Caryophyllaceae, Lamiaceae, Rubiaceae, Euphorbiaceae, Commelinaceae, Linderniaceae, Plantaginaceae, Geraniaceae, Boraginaceae, Onagraceae, Apiaceae, Zygophyllaceae and Papaveraceae.

[13] The herbicidal composition (or mixture) according to any one of [1] to [11], for controlling undesired plants or inhibiting their growth, the undesired plants being selected from the group consisting of Gramineae, Cyperaceae, Malvaceae, Asteraceae, Solanaceae, Amaranthaceae, Polygonaceae, Brassicaceae, Portulacaceae, Fabaceae, Caryophyllaceae, Lamiaceae, Rubiaceae, Commelinaceae, Plantaginaceae, Boraginaceae and Apiaceae.

[14] The herbicidal composition (or mixture) according to [12] or [13], wherein the undesired plants are plants which grow in winter.

[15] The herbicidal composition (or mixture) according to any one of [1] to [14], for use at a place where useful crops grow, the useful crops being selected from the group consisting of lawn, soybean (*Glycine max* (L.) Merrill), cotton (*Gossypium* spp.), wheat (*Triticum aestivum* (L.) Thell.), barley (*Hordeum vulgare* L.), rye (*Secale cereale* L.), rye wheat, pastures, oat (*Avena sativa* L.), rice (*Oryza sativa* L.), corn (*Zea mays* L.), sorghum (Sorghum spp.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tabaco (*Nicotiana tabacum*, L.) and coffee (*Coffea arabica*).

[16] The herbicidal composition (or mixture) according to any one of [1] to [14], for use at a place where useful crops grow, the useful crops being selected from the group consisting of lawn, soybean (*Glycine max* (L.) Merrill), cotton (*Gossypium* spp.), wheat (*Triticum aestivum* (L.) Thell.), barley (*Hordeum vulgare* L.), rye (*Secale cereale* L.), rye wheat, pastures, rice (*Oryza sativa* L.), corn (*Zea mays* L.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tabaco (*Nicotiana tabacum*, L.) and coffee (*Coffea arabica*).

[17] A method for controlling undesired plants, which comprises applying herbicidally effective amounts of (a) tolpyralate and (b) pyroxsulam, to the undesired plants or to a place where they grow.

[18] The method according to [17], wherein (a) and (b) are applied in a mixing weight ratio of from 1:0.001 to 1:20.

[19] The method according to [17], wherein (a) and (b) are applied in a mixing weight ratio of from 1:0.03 to 1:2.

[20] The method according to any one of [17] to [19], wherein (a) is applied in an amount of from 0.5 to 200 g/ha, and (b) is applied in an amount of from 0.1 to 150 g/ha.

[21] The method according to any one of [17] to [19], wherein (a) is applied in an amount of from 10 to 60 g/ha, and (b) is applied in an amount of from 5 to 30 g/ha.

[22] The method according to any one of [17] to [21], wherein (c) one component or two or more components selected from the group consisting of other herbicidal compound and a safener is further applied, and herbicidally effective amounts of (a) and (b), and (c), are applied simultaneously or continuously.

[23] The method according to [22], wherein (a), (b) and (c) are applied in a mixing weight ratio of from 1:0.001:0.001 to 1:20:80.

[24] The method according to [22] or [23], wherein (a) is applied in an amount of from 0.5 to 200 g/ha, (b) is applied in an amount of from 0.1 to 150 g/ha, and (c) is applied in an amount of from 0.01 to 1,000 g/ha.

[25] The method according to any one of [17] to [21], wherein herbicidally effective amounts of (a) tolpyralate and (b) pyroxsulam are applied with (c) one other herbicidal compound or two or more other herbicidal compounds simultaneously or continuously.

[26] The method according to [25], wherein (a), (b) and (c) other herbicidal compound are applied in a mixing weight ratio of from 1:0.001:0.05 to 1:20:80.

[27] The method according to [25] or [26], wherein (a) is applied in an amount of from 0.5 to 200 g/ha, (b) is applied in an amount of from 0.1 to 150 g/ha, and (c) other herbicidal compound is applied in an amount of from 10 to 1,000 g/ha.

[28] The method according to any one of [17] to [21], wherein herbicidally effective amounts of (a) tolpyralate and (b) pyroxsulam are applied with (c) one safener or two or more safeners simultaneously or continuously.

[29] The method according to [28], wherein (a), (b) and (c) safener are applied in a mixing weight ratio of from 1:0.001:0.001 to 1:20:20.

[30] The method according to [28] or [29], wherein (a) is applied in an amount of from 0.5 to 200 g/ha, (b) is applied in an amount of from 0.1 to 150 g/ha, and (c) safener is applied in an amount of from 0.01 to 500 g/ha.

[31] The method according to any one of [17] to [21], wherein herbicidally effective amounts of (a) tolpyralate and (b) pyroxsulam, and both (c) one other herbicidal compound or two or more other herbicidal compounds and (c) one safener or two or more safeners are applied simultaneously or continuously.

[32] The method according to [31], wherein (a), (b), (c) other herbicidal compound and (c) safener are applied in a mixing weight ratio of from 1:0.001:0.05:0.001 to 1:20:80:20.

[33] The method according to [31] or [32], wherein (a) is applied in an amount of from 0.5 to 200 g/ha, (b) is applied in an amount of from 0.1 to 150 g/ha, (c) other herbicidal compound is applied in an amount of from 10 to 1,000 g/ha, and (c) safener is applied in an amount of from 0.01 to 500 g/ha.

[34] The method according to any one of [17] to [33], wherein the undesired plants are selected from the group consisting of Gramineae, Cyperaceae, Alismataceae, Pontederiaceae, Lythraceae, Elatinaceae, Malvaceae, Asteraceae, Solanaceae, Amaranthaceae, Polygonaceae, Brassicaceae, Convolvulaceae, Portulacaceae, Fabaceae, Caryophyllaceae, Lamiaceae, Rubiaceae, Euphorbiaceae, Commelinaceae, Linderniaceae, Plantaginaceae, Geraniaceae, Boraginaceae, Onagraceae, Apiaceae, Zygophyllaceae and Papaveraceae.

[35] The method according to any one of [17] to [33], wherein the undesired plants are selected from the group consisting of Gramineae, Cyperaceae, Malvaceae, Asteraceae, Solanaceae, Amaranthaceae, Polygonaceae, Brassicaceae, Portulacaceae, Fabaceae, Caryophyllaceae, Lamiaceae, Rubiaceae, Commelinaceae, Plantaginaceae, Boraginaceae and Apiaceae.

[36] The method according to any one of [17] to [35], wherein the undesired plants are plants which grow in winter.

[37] The method according to any one of [17] to [36], wherein the place where the undesired plants grow is a place where useful crops grow, the useful crops being selected from the group consisting of lawn, soybean (*Glycine max* (L.) Merrill), cotton (*Gossypium* spp.), wheat (*Triticum aestivum* (L.) Thell.), barley (*Hordeum vulgare* L.), rye (*Secale cereale* L.), rye wheat, pastures, oat (*Avena sativa* L.), rice (*Oryza sativa* L.), corn (*Zea mays* L.), sorghum (Sorghum spp.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tobacco (*Nicotiana tabacum*, L.) and coffee (*Coffea arabica*).

[38] The method according to any one of [17] to [36], wherein the place where the undesired plants grow is a place where useful crops grow, the useful crops being selected from the group consisting of lawn, soybean (*Glycine max* (L.) Merrill), cotton (*Gossypium* spp.), wheat (*Triticum aestivum* (L.) Thell.), barley (*Hordeum vulgare* L.), rye (*Secale cereale* L.), rye wheat, pastures, rice (*Oryza sativa* L.), corn (*Zea mays* L.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tobacco (*Nicotiana tabacum*, L.) and coffee (*Coffea arabica*).

[39] A combination of (a) tolpyralate and (b) pyroxsulam as active ingredients.

[40] The combination according to [39], wherein the mixing weight ratio of (a) to (b) is from 1:0.001 to 1:20.

[41] The combination according to [39], wherein the mixing weight ratio of (a) to (b) is from 1:0.03 to 1:2.

[42] A combination of (a) tolpyralate, (b) pyroxsulam and (c) one component or two or more components selected from the group consisting of other herbicidal compound and a safener as active ingredients.

[43] The combination according to [42], wherein the mixing weight ratio of (a):(b):(c) is from 1:0.001:0.001 to 1:20:80.

[44] A combination of (a) tolpyralate, (b) pyroxsulam and (c) one other herbicidal compound or two or more other herbicidal compounds as active ingredients.

[45] The combination according to [44], wherein the mixing weight ratio of (a):(b):(c) other herbicidal compound is from 1:0.001:0.05 to 1:20:80.

[46] A combination of (a) tolpyralate, (b) pyroxsulam and (c) one safener or two or more safeners as active ingredients.

[47] The combination according to [46], wherein the mixing weight ratio of (a):(b):(c) safener is from 1:0.001:0.001 to 1:20:20.

[48] A combination of (a) tolpyralate, (b) pyroxsulam, (c) one other herbicidal compound or two or more other herbicidal compounds and (c) one safener or two or more safeners as active ingredients.

[49] The combination according to [48], wherein the mixing weight ratio of (a):(b):(c) other herbicidal compound: (c) safener is from 1:0.001:0.05:0.001 to 1:20:80:20.

[50] The combination according to any one of [39] to [49], for controlling undesired plants or inhibiting their growth, the undesired plants being selected from the group consisting of Gramineae, Cyperaceae, Alismataceae, Pontederiaceae, Lythraceae, Elatinaceae, Malvaceae, Asteraceae, Solanaceae, Amaranthaceae, Polygonaceae, Brassicaceae, Convolvulaceae, Portulacaceae, Fabaceae, Caryophyllaceae, Lamiaceae, Rubiaceae, Euphorbiaceae, Commelinaceae, Linderniaceae, Plantaginaceae, Geraniaceae, Boraginaceae, Onagraceae, Apiaceae, Zygophyllaceae and Papaveraceae.

[51] The combination according to any one of [39] to [49], for controlling undesired plants or inhibiting their growth, the undesired plants being selected from the group consisting of Gramineae, Cyperaceae, Malvaceae, Asteraceae, Solanaceae, Amaranthaceae, Polygonaceae, Brassicaceae, Portulacaceae, Fabaceae, Caryophyllaceae, Lamiaceae, Rubiaceae, Commelinaceae, Plantaginaceae, Boraginaceae and Apiaceae.

[52] The combination according to [50] or [51], wherein the undesired plants are plants which grow in winter.

[53] The combination according to any one of [39] to [52], for use at a place where useful crops grow, the useful crops being selected from the group consisting of lawn, soybean (*Glycine max* (L.) Merrill), cotton (*Gossypium* spp.), wheat (*Triticum aestivum* (L.) Thell.), barley (*Hordeum vulgare* L.), rye (*Secale cereale* L.), rye wheat, pastures, oat (*Avena* sativa L.), rice (*Oryza sativa* L.), corn (*Zea mays* L.), sorghum (Sorghum spp.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tobacco (*Nicotiana tabacum*, L.) and coffee (*Coffea arabica*).

[54] The combination according to any one of [39] to [53], for use at a place where useful crops grow, the useful crops being selected from the group consisting of lawn, soybean (*Glycine max* (L.) Merrill), cotton (*Gossypium* spp.), wheat (*Triticum aestivum* (L.) Thell.), barley (*Hordeum vulgare* L.), rye (*Secale cereale* L.), rye wheat, pastures, rice (*Oryza sativa* L.), corn (*Zea mays* L.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tobacco (*Nicotiana tabacum*, L.) and coffee (*Coffea arabica*).

EXAMPLES

Example 1

Upland field soil was put into a 1/1,000,000 hectare pot, and seeds of velvetleaf (*Abutilon theophrasti* Medik.) were sown. When the velvetleaf reached 4.2 to 5.1 leaf stage, a SC formulation including tolpyralate as an active ingredient and a WP formulation including pyroxsulam as an active ingredient were diluted with water (in an amount corresponding to 200 L/ha), and 0.25 vol % of an adjuvant (tradename: Destiny HC, manufactured by Winfield Solutions, LLC.) was added, followed by foliar treatment to the velvetleaf with an automatic boom sprayer. On the 12th day after the foliar treatment, the state of growth of the velvetleaf was visually observed, and the growth inhibition rate was obtained in accordance with the evaluation criteria (Table 1). Further, the growth inhibition rate (expected value) was calculated in accordance with the Colby's formula.

Growth inhibition rate (%)=0 (equivalent to the non-treated area) to 100 (complete kill)

TABLE 1

| | | Growth inhibition rate (%) | | |
|---|---|---|---|---|
| Compound | Dose (g/ha) | Measured value (A) | Expected value (B) | (A)-(B) |
| Tolpyralate | 7.5 | 32 | | |
| | 3.75 | 27 | | |
| | 2.5 | 20 | | |
| Pyroxsulam | 3 | 27 | | |
| | 2.25 | 25 | | |
| | 1.5 | 17 | | |
| | 0.75 | 2 | | |
| | 0.5 | 2 | | |
| Tolpyralate + pyroxsulam | 7.5 + 300.75 | 57 | 33 | 24 |
| | 7.5 + 300.5 | 55 | 33 | 22 |
| | 3.75 + 303 | 62 | 47 | 15 |
| | 3.75 + 302.25 | 62 | 45 | 17 |
| | 3.75 + 301.5 | 62 | 39 | 23 |
| | 2.5 + 303 | 67 | 42 | 25 |
| | 2.5 + 302.25 | 55 | 40 | 15 |
| | 2.5 + 301.5 | 58 | 34 | 24 |
| | 2.5 + 300.75 | 55 | 22 | 33 |

Example 2

Upland field soil was put into a 1/1,000,000 hectare pot, and seeds of velvetleaf (*Abutilon theophrasti* Medik.) were sown. When the velvetleaf reached 5.1 to 6.1 leaf stage, a SC formulation including tolpyralate as an active ingredient and a WP formulation including pyroxsulam as an active ingredient were diluted with water (in an amount corresponding to 200 L/ha), and 0.25 vol % of an adjuvant (tradename: Destiny HC, manufactured by Winfield Solutions, LLC.) was added, followed by foliar treatment to the velvetleaf with an automatic boom sprayer. On the 15th day after the foliar treatment, the state of growth of the velvetleaf was visually observed, and the growth inhibition rate was obtained in accordance with the evaluation criteria (Table 2). Further, the growth inhibition rate (expected value) was calculated in accordance with the Colby's formula.

Growth inhibition rate (%)=0 (equivalent to the non-treated area) to 100 (complete kill)

TABLE 2

| | | Growth inhibition rate (%) | | |
|---|---|---|---|---|
| Compound | Dose (g/ha) | Measured value (A) | Expected value (B) | (A)-(B) |
| Tolpyralate | 7.5 | 40 | | |
| | 2.5 | 37 | | |
| Pyroxsulam | 6 | 35 | | |
| | 5 | 33 | | |
| | 4 | 30 | | |
| | 3 | 20 | | |
| | 0.5 | 0 | | |
| | 0.25 | 0 | | |
| | 0.125 | 0 | | |
| Tolpyralate + pyroxsulam | 2.5 + 6 | 67 | 40 | 27 |
| | 7.5 + 0.5 | 50 | 40 | 10 |
| | 7.5 + 0.25 | 47 | 40 | 7 |
| | 7.5 + 0.125 | 47 | 59 | −12 |
| | 2.5 + 5 | 70 | 58 | 12 |
| | 2.5 + 4 | 70 | 56 | 14 |
| | 2.5 + 3 | 70 | 50 | 20 |

Example 3

Upland field soil was put into a 1/1,000,000 hectare pot, and seeds of velvetleaf (*Abutilon theophrasti* Medik.) were sown. When the velvetleaf reached 4.8 to 5.4 leaf stage, a SC formulation including tolpyralate as an active ingredient, and a WP formulation including pyroxsulam as an active ingredient or a SC formulation including penoxsulam as an active ingredient, were diluted with water (in an amount corresponding to 200 L/ha), and 0.25 vol % of an adjuvant (tradename: Destiny HC, manufactured by Winfield Solutions, LLC.) was added, followed by foliar treatment to velvetleaf with an automatic boom sprayer. On the 8th day after the foliar treatment, the state of growth of the velvetleaf was visually observed, and the growth inhibition rate was obtained in accordance with the evaluation criteria (Table 3). Further, the growth inhibition rate (expected value) was calculated in accordance with the Colby's formula.

Growth inhibition rate (%)=0 (equivalent to the non-treated area) to 100 (complete kill)

TABLE 3

| | | Growth inhibition rate (%) | | |
|---|---|---|---|---|
| Compound | Dose (g/ha) | Measured value (A) | Expected value (B) | (A)-(B) |
| Tolpyralate | 7.5 | 10 | | |
| | 2.5 | 10 | | |

TABLE 3-continued

| Compound | Dose (g/ha) | Measured value (A) | Expected value (B) | (A)-(B) |
|---|---|---|---|---|
| Pyroxsulam | 3 | 32 | | |
| | 0.75 | 0 | | |
| | 0.5 | 0 | | |
| Penoxsulam | 3 | 37 | | |
| | 0.75 | 0 | | |
| | 0.5 | 0 | | |
| Tolpyralate+30pyroxsulam | 7.5 + 0.75 | 37 | 10 | 27 |

TABLE 3-continued

| Compound | Dose (g/ha) | Measured value (A) | Expected value (B) | (A)-(B) |
|---|---|---|---|---|
| | 7.5 + 0.5 | 30 | 10 | 20 |
| | 2.5 + 3 | 55 | 39 | 16 |
| | 2.5 + 0.75 | 37 | 10 | 27 |
| Tolpyralate+30penoxsulam | 7.5 + 0.75 | 13 | 10 | 3 |
| | 7.5 + 0.5 | 10 | 10 | 0 |
| | 2.5 + 3 | 37 | 43 | −6 |
| | 2.5 + 0.75 | 17 | 10 | 7 |

As shown in Table 3, with penoxsulam having a structure analogous to (b) pyroxsulam of the present invention, a grow inhibition rate more than expected was not obtained, whereas with the combination of (a) tolpyralate and (b) pyroxsulam of the present invention, a grow inhibition effect remarkably higher than expected was exhibited.

Example 4

In a wheat field in which seeds of wild oat (*Avena fatua* L.), black grass (*Alopecurus myosuroides* Huds.), italian ryegrass (*Lolium multiflorum* Lam.), Kochia (*Kochia scoparia* L.) and common chickweed (*Stellaria media* L.) were sown, when the wheat reached 3 leaf stage, a SC formulation including tolpyralate as an active ingredient and a WP formulation including pyroxsulam as an active ingredient were diluted with water (in an amount corresponding to 200 L/ha), and 0.5 vol % of an adjuvant (tradename: Destiny HC, manufactured by Winfield Solutions, LLC.) was added, followed by foliar treatment to the plants with a pressure sprayer. The leaf stage at the time of the foliar treatment of each plant is shown in Table 4. On the 89th and 125th days after the foliar treatment, the state of growth of each plant was visually observed, and the growth inhibition rate was obtained in accordance with the evaluation criteria (Table 5).

Growth inhibition rate (%)=0 (equivalent to the non-treated area) to 100 (complete kill)

TABLE 4

| Plant | Leaf stage at the time of treatment |
|---|---|
| wild oat (*Avena fatua* L.) | 1.5-2.3 L |
| black grass (*Alopecurus myosuroides* Huds.) | 1.5-2.3 L |
| italian ryegrass (*Lolium multiflorum* Lam.) | 2.5-3.7 L |
| Kochia (*Kochia scoparia* L.) | 2.5-4.0 pairs |
| common chickweed (*Stellaria media* L.) | 1.5-2.5 pairs |

TABLE 5

| Compound | Dose (g/ha) | Day after treatment | Wild oat | Black grass | Italian ryegrass | Kochia | Common chickweed |
|---|---|---|---|---|---|---|---|
| Tolpyralate + pyroxsulam | 30 + 15 | 89 | 97 | 100 | 99 | 100 | 98 |
| | | 125 | 92 | 100 | 100 | 100 | 95 |
| | 50 + 15 | 89 | 98 | 100 | 99 | 100 | 100 |
| | | 125 | 94 | 100 | 100 | 100 | 95 |

As shown in Table 5, it was found that the growth controlling or inhibition effects of the combination of the present invention over various plants which are also called winter weeds last over a long period of time.

Example 5

In a wheat field in which seeds of wild oat (*Avena fatua* L.), black grass (*Alopecurus myosuroides* Huds.), italian ryegrass (*Lolium multiflorum* Lam.), Kochia (*Kochia scoparia* L.) and common chickweed (*Stellaria media* L.) were sown, when the wheat reached 3 leaf stage, a SC formulation including tolpyralate as an active ingredient, a WP formulation including pyroxsulam as an active ingredient and an EC formulation including bromoxynil-octanoate as an active ingredient were diluted with water (in an amount corresponding to 200 L/ha), and 0.5 vol % of an adjuvant (tradename: Destiny HC, manufactured by Winfield Solutions, LLC.) was added, followed by foliar treatment to the plants with a pressure sprayer. The leaf stage at the time of the foliar treatment of each plant is shown in Table 6. On the 14th and 89th days after the foliar treatment, the state of growth of each plant was visually observed, and the growth inhibition rate was obtained in accordance with the evaluation criteria (Tables 7 and 8).

Growth inhibition rate (%)=0 (equivalent to the non-treated area) to 100 (complete kill)

TABLE 6

| Plant | Leaf stage at the time of treatment |
|---|---|
| Wild oat (*Avena fatua* L.) | 1.5-2.3 L |
| Black grass (*Alopecurus myosuroides* Huds.) | 1.5-2.3 L |
| Italian ryegrass (*Lolium multiflorum* Lam.) | 2.5-3.7 L |
| Kochia (*Kochia scoparia* L.) | 2.5-4.0 pairs |
| Common chickweed (*Stellaria media* L.) | 1.5-2.5 pairs |

TABLE 7

(On the 14th day after treatment)

| | | Growth inhibition rate (%) | | | | |
|---|---|---|---|---|---|---|
| Compound | Dose (g/ha) | Wild oat | Black grass | Italian ryegrass | Kochia | Common chickweed |
| Tolpyralate + pyroxsulam | 30 + 15 | 60 | 78 | 60 | 40 | 70 |
| | 50 + 15 | 65 | 78 | 65 | 40 | 78 |
| Tolpyralate + pyroxsulam + bromoxynil-octanoate | 30 + 15 + 174.3 | 63 | 75 | 60 | 99 | 99 |
| | 50 + 15 + 174.3 | 63 | 70 | 65 | 95 | 96 |

TABLE 8

(On the 89th day after treatment)

| | | Growth inhibition rate (%) | | | | |
|---|---|---|---|---|---|---|
| Compound | Dose (g/ha) | Wild oat | Black grass | Italian ryegrass | Kochia | Common chickweed |
| Tolpyralate + pyroxsulam | 30 + 15 | 97 | 100 | 99 | 100 | 98 |
| | 50 + 15 | 98 | 100 | 99 | 100 | 100 |
| Tolpyralate + pyroxsulam + bromoxynil-octanoate | 30 + 15 + 174.3 | 90 | 100 | 97 | 100 | 100 |
| | 50 + 15 + 174.3 | 97 | 100 | 97 | 100 | 100 |

As shown in Tables 7 and 8, it was found that by further applying bromoxynil-octanoate in combination with tolpyralate and pyroxsulam, effects against broadleaf weeds such as Kochia and common chickweed are obtained at an earlier stage. Further, it was found that the combination of tolypyralate, pyroxsulam and bromoxynil-octanoate has long-lasting growth controlling or inhibition effects also over various winter weeds including Gramineae.

Example 6

Upland field soil was put into a 1/1,000,000 hectare pot, and seeds of giant foxtail (*Setaria faberi*) and wild oat (*Avena fatua* L.) were sown. When the giant foxtail reached 4.5 to 5.3 leaf stage and the wild oat reached 5.3 to 6.0 leaf stage, a SC formulation including tolpyralate as an active ingredient, a WP formulation including pyroxsulam as an active ingredient, an EC formulation including bromxinyl-octanoate as an active ingredient and a WP formulation including cloquintocet mexyl as an active ingredient, were diluted with water (in an amount corresponding to 200 L/ha), and 0.5 vol % of an adjuvant (tradename: Destiny HC, manufactured by Winfield Solutions, LLC.) was added, followed by foliar treatment to the plants with a small spray gun. On the 21st day or 22nd day after the foliar treatment, the state of growth of each plant was visually observed, and the growth inhibition rate was obtained in accordance with the evaluation criteria (Table 9).

Growth inhibition rate (%)=0 (equivalent to the non-treated area) to 100 (complete kill)

TABLE 9

| | | Growth inhibition rate (%) | |
|---|---|---|---|
| Compound | Dose (g/ha) | Giant foxtail (21st day) | Wild oat (22nd day) |
| Tolpyralate + pyroxsulam + bromoxynil-octanoate | 30 + 15 + 174.3 | 84 | 88 |
| | 50 + 15 + 174.3 | 88 | 77 |
| Tolpyralate + pyroxsulam + bromoxynil-octanoate + cloquintocet mexyl | 30 + 15 + 174.3 + 100 | 89 | 87 |

As shown in Table 9, it was found that by further applying cloquintocet mexyl as a safter, a growth inhibition rate at the same level as the effect by the combination of tolpyralate, pyroxsulam and bromoxynil-octanoate was obtained.

Example 7

In a wheat field in which seeds of wheat were sown, when the wheat reached 3 leaf stage, a SC formulation including tolpyralate as an active ingredient, a WP formulation including pyroxsulan as an active ingredient, an EC formulation including bromoxynil-octanoate as an active ingredient and a WP formulation including cloquintocet mexyl as an active ingredient were diluted with water (in an amount corresponding to 200 L/ha), and 0.5 vol % of an adjuvant (tradename: Destiny HC, manufactured by Winfield Solutions, LLC.) was added, followed by foliar treatment to the wheat with a pressure sprayer. On the 14th and 89th days after the foliar treatment, the state of growth of the wheat was visually observed, and the growth inhibition rate was obtained in accordance with the evaluation criteria (Table 10).

Growth inhibition rate (%)=0 (equivalent to the non-treated area) to 100 (complete kill)

TABLE 10

| | | Growth inhibition rate (%) | |
|---|---|---|---|
| Compound | Dose (g/ha) | 14th day | 89th day |
| Tolpyralate + pyroxsulam | 100 + 30 | 23 | 40 |
| Tolpyralate + pyroxsulam + cloquintocet mexyl | 100 + 30 + 100 | 16 | 4 |
| Tolpyralate + pyroxsulam + bromoxynil-octanoate + cloquintocet mexyl | 100 + 30 + 348.6 + 100 | 19 | 7 |

As shown in Table 10, inhibition of growth of the wheat by application of tolpyralate and pyroxsulam was confirmed to be about 40% even at the latter stage of growth, and it was found that by applying cloquintocet mexyl as a safer in combination, growth inhibition at an early stage was reduced or growth was recovered, and safety of the wheat was secured.

The entire disclosure of Japanese Patent Application No. 2019-100981 filed on May 30, 2019 including specification, claims, drawings and summary is incorporated herein by reference in its entirety.

The invention claimed is:
1. A herbicidal composition comprising as active ingredients (a) tolpyralate and (b) pyroxsulam, wherein the mixing weight ratio of (a) to (b) is from 1:0.03 to 1:2.

2. The herbicidal composition according to claim 1, which further contains (c) one component or two or more components selected from the group consisting of other herbicidal compound and a safener.

3. The herbicidal composition according to claim 1, for controlling undesired plants or inhibiting their growth, the undesired plants being selected from the group consisting of Gramineae, Cyperaceae, Alismataceae, Pontederiaceae, Lythraceae, Elatinaceae, Malvaceae, Asteraceae, Solanaceae, Amaranthaceae, Polygonaceae, Brassicaceae, Convolvulaceae, Portulacaceae, Fabaceae, Caryophyllaceae, Lamiaceae, Rubiaceae, Euphorbiaceae, Commelinaceae, Linderniaceae, Plantaginaceae, Geraniaceae, Boraginaceae, Onagraceae, Apiaceae, Zygophyllaceae and Papaveraceae.

4. The herbicidal composition according to claim 1, for use at a place where useful crops grow, the useful crops being selected from the group consisting of lawn, soybean (*Glycine max* (L.) Merrill), cotton (*Gossypium* spp.), wheat (*Triticum aestivum* (L.) Thell.), barley (*Hordeum vulgare* L.), rye (*Secale cereale* L.), rye wheat, pastures, oat (*Avena sativa* L.), rice (*Oryza sativa* L.), corn (*Zea mays* L.), sorghum (Sorghum spp.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tabaco (*Nicotiana tabacum*, L.) and coffee (*Coffea arabica*).

5. A method for controlling undesired plants, which comprises applying herbicidally effective amounts of (a) tolpyralate and (b) pyroxsulam, to the undesired plants or to a place where they grow, wherein (a) and (b) are applied in a mixing weight ratio of from 1:0.03 to 1:2.

6. The method according to claim 5, wherein (a) is applied in an amount of from 0.5 to 200 g/ha, and (b) is applied in an amount of from 0.1 to 150 g/ha.

7. The method according to claim 5, wherein (a) is applied in an amount of from 10 to 60 g/ha, and (b) is applied in an amount of from 5 to 30 g/ha.

8. The method according to claim 5, wherein (c) one component or two or more components selected from the group consisting of other herbicidal compound and a safener is further applied, and herbicidally effective amounts of (a) and (b), and (c), are applied simultaneously or continuously.

9. The method according to claim 5, wherein the undesired plants are selected from the group consisting of Gramineae, Cyperaceae, Alismataceae, Pontederiaceae, Lythraceae, Elatinaceae, Malvaceae, Asteraceae, Solanaceae, Amaranthaceae, Polygonaceae, Brassicaceae, Convolvulaceae, Portulacaceae, Fabaceae, Caryophyllaceae, Lamiaceae, Rubiaceae, Euphorbiaceae, Commelinaceae, Linderniaceae, Plantaginaceae, Geraniaceae, Boraginaceae, Onagraceae, Apiaceae, Zygophyllaceae and Papaveraceae.

10. The method according to claim 5, wherein the place where the undesired plants grow is a place where useful crops grow, the useful crops being selected from the group consisting of lawn, soybean (*Glycine max* (L.) Merrill), cotton (*Gossypium* spp.), wheat (*Triticum aestivum* (L.) Thell.), barley (*Hordeum vulgare* L.), rye (*Secale cereale* L.), rye wheat, pastures, oat (*Avena sativa* L.), rice (*Oryza sativa* L.), corn (*Zea mays* L.), sorghum (Sorghum spp.), rape (*Brassica rapa* L.), rapeseed (*Brassica napus* L.), sunflower (*Helianthus annuus* L.), sugar beet (*Beta vulgaris* L. var. saccharifera Alef.), sugarcane (*Saccharum sinense* Roxb.), peanut (*Arachis hypogaea* L.), flax (*Linum usitatissimum* L.), tobacco (*Nicotiana tabacum*, L.) and coffee (*Coffea arabica*).

11. A mixture containing as active ingredients (a) tolpyralate and (b) pyroxsulam, wherein the mixing weight ratio of (a) to (b) is from 1:0.03 to 1:2.

12. A combination of (a) tolpyralate and (b) pyroxsulam as active ingredients, wherein the mixing weight ratio of (a) to (b) is from 1:0.03 to 1:2.

\* \* \* \* \*